Sept. 5, 1967  R. S. DRAKE  3,339,883

PRESSURE CONNECTION ASSEMBLY

Filed Jan. 27, 1965

INVENTOR

RONALD S. DRAKE

BY Beaman & Beaman

ATTORNEYS

United States Patent Office 3,339,883
Patented Sept. 5, 1967

3,339,883
PRESSURE CONNECTION ASSEMBLY
Ronald S. Drake, Jackson, Mich., assignor to Acme Industries, Inc., a corporation of Delaware
Filed Jan. 27, 1965, Ser. No. 428,355
5 Claims. (Cl. 251—149.4)

ABSTRACT OF THE DISCLOSURE

A pressure connection fitting utilizing check valve structure wherein the valve is automatically displaced upon a conduit being attached to the fitting, the valve being operated by an actuator which simultaneously functions as a seal betwen the fitting and conduit connection.

In pressurized medium circuits, particularly sealed circuits such as the type found in refrigeration systems, it is occasionally desirable to "tap" into the circuit to permit the circuit to be charged, gauged, or evacuated. It has been common practice to provide sealed pressurized circuits with valves having threaded connections whereby the charging or evacuating apparatus, or a gauge, may be attached to the valve threads and upon opening the valve access to the circuit is provided. As conventional valves employed for this purpose are relatively expensive, their use in a pressurized circuit is limited and often only a single tapping location is provided in a large circuit, even though it would be desirable to have a number of locations within the circuit at which tapping could be accomplished.

In the refrigeration art, it is also becoming common to pressurize and seal the components of a refrigeration circuit at the point of manufacture, whereby the components, upon being assembled at the point of use, use connection fittings which destroy the sealing means and permit a charged circuit to be immediately provided which is free from air, water vapor, or other foreign matter. The fittings employed to seal the circuits of such components are usually of the single service type and will not provide sealing if the fitting is disconnected once the circuit has been established by the fitting.

It is an object of the invention to provide a pressure connection assembly which may be employed as a "tap" for a pressurized medium system, or may be used as a system sealing fitting wherein a fitting includes a valve member which is operated by conventional conduit and connector nut assemblies, and wherein the valve is capable of multiple operations.

A further object of the invention is to provide a pressure connection assembly having a valve wherein the need for special tools or valve depressors is eliminated.

A further object of the invention is to provide a valve pressure connection assembly which may be very economically produced and assembled and is adapted to be used with a conventional flanged conduit and connector nut, and wherein actuation of the valve is produced by the assembly of the conduit and nut upon the fitting.

An additional object of the invention is to provide a pressure connection assembly having a valve actuator adapted to be actuated by a conventional flanged conduit and connector nut wherein the valve actuator includes a sealing element adapted to be interposed between the conduit flange and the fitting.

Figure 1:
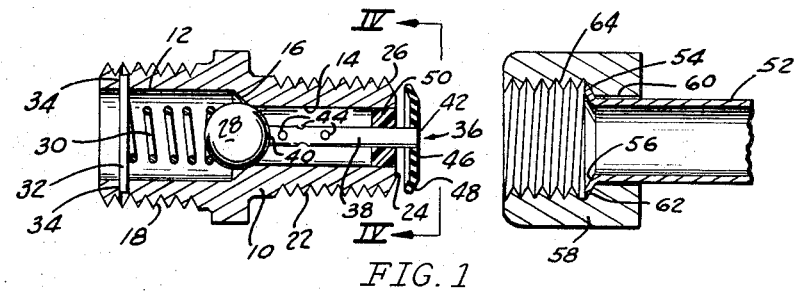
Figure 2:
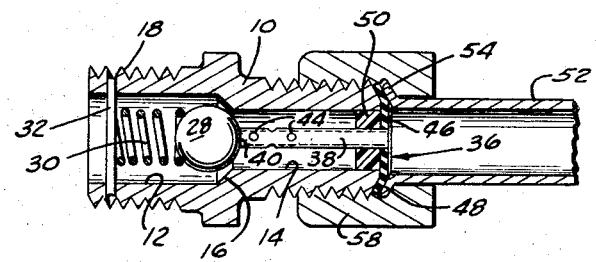
Figure 4:
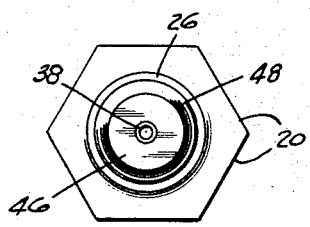
Figure 3:
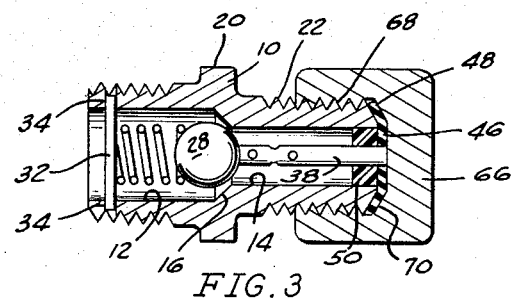
Figure 6:
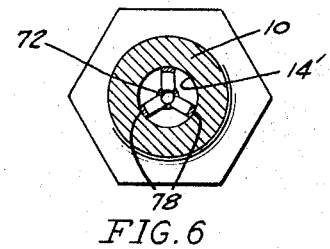
Figure 5:
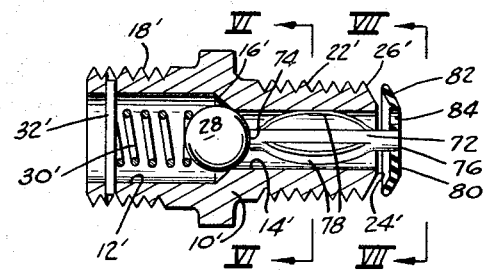
Figure 7:
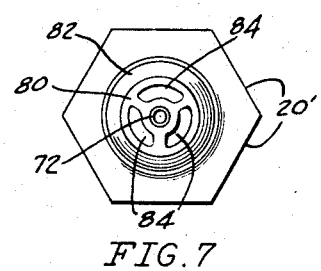

These and other objects of the invention arising from the details and relationships of the components of an embodiment thereof will be apparent from the following description and accompanying drawings wherein:

FIG. 1 is a diametrical, elevational, sectional view of a pressure connection assembly, and a flanged conduit and connector nut, shown in the unconnected relationship, FIG. 2 is an elevational, diametrical, sectional view of a fitting of the invention upon a flanged conduit and connector nut being connected thereto, illustrating the valve in the full open position, FIG. 3 is an elevational, diametrical, sectional view of the fitting in accord with the invention having a cap theaded thereon, FIG. 4 is an elevational end view taken along line IV—IV of FIG. 1, FIG. 5 is an elevational, diametrical, sectional view of another embodiment of valve actuator structure illustrating the valve in the closed position, FIG. 6 is an elevational, sectional view taken along section VI—VI of FIG. 5, and FIG. 7 is an elevational, sectional view taken along section VII—VII of FIG. 5.

The pressure connection assembly fitting in accord with the invention includes a tubular body 10 which may be economically manufactured of metal, synthetic plastic, or any suitable material on a screw machine, or it may be cast. The body 10 includes an enlarged bore 12 and a coaxial bore 14 of reduced dimension. Intermediate the bores 12 and 14 a conical annular valve seat 16 is defined. Exterior threads 18 are defined upon the fitting to permit the fitting to be threaded into a threaded coupling, bore, or fitting communicating with the pressurized medium circuit. Wrench flats 20 are defined upon the fitting and threads 22 are defined upon the fitting body adjacent the end 24 thereof for receiving the connector nut of a flanged conduit. An annular conical surface 26 is defined upon the end of the fitting for establishing a sealed connection with the flange of a flanged conduit in the conventional manner.

A spherical ball type valve 28 is received within the fitting body bore 12 and is biased toward a seating engagement with the valve seat 16 by a compression spring 30 located within bore 12. A pin 32 extends through holes 34 diametrically defined in the body, and functions as a bearing anchor for the spring 30, as will be apparent from FIGS. 1 and 2. Thus, the normal position of the ball valve 28 is that shown in FIG. 1 wherein the bores 12 and 14 are sealed with respect to each other and the influence of the pressurized medium within the bore 12 will tend to maintain the valve 28 seated.

Operation of the valve 28 is produced through a valve actuator generally indicated at 36. The disclosed valve actuator includes a stem 38 having an inner end 40 and an outer end 42. The stem 38 is of a tubular configuration including a wall in which openings 44 are defined which communicate with the interior of the stem. The outer end 42 of the stem is provided with a circular head 46 formed of a relatively rigid material such as a soft metal or a hard synthetic plastic composition, and includes an annular peripheral portion 48 which is preferably conically shaped to conform to the annular configuration of the fitting body conical surface 26. As will be apparent from FIGS. 1 and 2, the diameter of the head 46 is such as to radially position the annular peripheral portion of the head near the body conical surface 26, and the stem 38 is of such a length as to normally locate the head axially spaced from the body end 24 when the stem end 40 is engaging the valve 28, as will be apparent from FIG. 1. The stem 38 and head 46 are interconnected in such a manner that the stem end 42 extends through the head as to form a passage therethrough.

As it is desirable that the valve actuator be retained within the body bore 14 in a manner as shown in FIG. 1, a sleeve-type retainer 50 may be located within the bore 14 to position the actuator therein. The retainer 50 may be formed of a synthetic plastic material having an outer diameter which permits the retainer to be pressed into position within the bore 14 and an inner diameter which frictionally engages the actuator stem 38 sufficiently to prevent the actuator from freely falling or vibrating from the bore, but which permits the actuator to axially slide relative to the retainer under the influence of the spring 30.

In the right half of FIG. 1, a conventional flanged conduit and connector nut assembly is illustrated. The conduit 52 is usually formed of copper, brass, bronze, aluminum or steel tubing, and has been formed at the end to define a conical flange 54 having a conical sealing surface 56. A connector nut 58 is usually formed with a hexagonal outer configuration for receiving a wrench, and is provided with a bore 60 adapted to rotatably receive the conduit 52. A conical surface 62 is disposed adjacent the bore 60 to engage the exterior surface of the conduit flange 54 and threads 64 are defined within the nut for cooperation with the fitting body threads 22. The flanged conduit and connector nut assembly is of a conventional type, as is commonly used in fluid circuits.

In use, the pressure connection assembly of the invention is assembled as shown in FIG. 1 and is attached to a component of a pressurized circuit, a refrigerant condenser, for instance, by threads 18 wherein the pressurized medium of the circuit will enter the bore 12 and tend to maintain the valve 28 in sealing engagement with the valve seat 16. When it is desired to "tap" into the pressurized medium circuit for charging, evacuation, gauging, or other purposes, the flanged conduit 52, which is in communication with the charging, evacuation or gauging device, is brought into axial alignment with the body threads 22. The nut 58 is then threaded upon the body threads 22. The axial spacing of the valve actuator head 46 from the body end 24 is such as to permit the connector nut to initially mate with the body threads 22 before the conduit flange 54 engages the actuator head. As the nut 58 is threaded upon the body 10, the conduit flange surface 56 engages the outer surface of the annular portion of the head 46 and continued rotation of the nut simultaneously moves the flange and conduit toward the body and axially translates the stem 38 through the retainer 50. As the stem end 40 is preferably initially in engagement with the valve 28, initial axial movement of the actuator to the left, FIGS. 1 and 2, displaces the valve from the seat 16 and permits fluid flow from the body bore 12 into the bore 14. The nut 58 is screwed on the body 10 until the conduit flange surface 56 firmly engages the valve actuator head portion 48 and forces the actuator peripheral portion into a sealing relationship with the body conical surface 26, as will be apparent from FIG. 2. At this time the conduit 52 is sealingly connected to the fitting body 10 and the valve 28 is at the "full open" position. The pressurized medium entering the bore 14 flows through the openings 44 defined in the stem 38 and into the conduit 52 through the open outer end 42 of the stem.

When it is desired to disconnect the conduit 52 from the body 10, the nut 58 is unscrewed from the body threads 22 and the resultant axial movement of the nut backs the conduit flange 54 away from the body end 24. This movement permits the valve actuator 36 to likewise move to the right, FIGS. 1 and 2, under the influence of the spring 30 and, as the nut 58 is removed from the body, the valve 28 is in the process of closing and will seat upon the valve seat 16 before the connector nut is completely removed from the body threads 22. Thus, very little of the pressurized medium escapes during the disconnect procedure.

To protect the valve actuator 36 and to insure that foreign matter does not accumulate within the stem 38 or the bore 14, it is preferable that a threaded cap 66, FIG. 3, be screwed upon the body threads 22 when the fitting is not being used. The cap 66 includes a threaded bore 68 and a conical surface 70 which cooperates with the head 46 in a manner identical to that of the flange 54 of the conduit 52. Thus, when the cap 66 is fully threaded upon the body 10, the valve 28 will be unseated. However, as a sealing connection between the cap 66 and the body end 24 is produced by the peripheral annular portion 48 of the head, there will be no escape of pressurized medium from the fitting.

FIGS. 5, 6 and 7 illustrate a variation in the valve actuator structure wherein a higher flow capacity may be produced than with the previously described embodiment. In the embodiment of FIGS. 5, 6 and 7, components identical to those previously described are indicated by like primed references.

The stem 72 may be of a generally cylindrical configuration including an inner end 74 and an outer end 76. Between the ends of the stem, the wall portion thereof may be slit and bowed outwardly to produce resilient bridges 78. Whether the bridges 78 are integrally formed from the wall of the stem or are defined in a sleeve, which is slipped over a cylindrical stem, is a matter of choice, although the former construction is illustrated. The head 80 is attached to the outer end 76 of the stem and includes an annular peripheral sealing portion 82, as will be apparent from FIGS. 5 and 7. A plurality of openings 84, three in the illustrated embodiment, are defined in the head 80 intermediate the stem 72 and the peripheral portion 82 thereof whereby, upon the opening of the valve 28', the fluid medium within the valve bore 14' may flow directly through the head 80 into the flanged conduit connected to body 10', and the increased flow capacities of this embodiment, with respect to the previously described embodiment, will be obvious. As the resilient bridges 78 snugly engage the bore 14', the bridges will retain the valve actuator within the bore, yet permit the necessary axial movement of the actuator to function as described above.

As actuation of the valve 28 is accomplished solely by engagement of the conduit flange 54 with the valve actuator during the threading of a connector nut upon the body 10, no special tools, valve depressors, or other devices are needed to permit a successful connection between the fitting and the conduit to be accomplished. The simplified construction of the fitting of the invention minimizes the cost of this type of valve fitting and thereby makes it economically feasible to locate these devices at various locations within a refrigeration circuit for the convenience of installation, repair and maintenance personnel.

It is appreciated that various modifications to the illustrated embodiments may be apparent to those skilled in the art without departing from the spirit and scope of the invention, and it is intended that the invention be defined only by the scope of the following claims:

I claim:

1. A valved fitting adapted to threadedly connect to a flanged conduit and connector nut assembly comprising, in combination:

(a) a body having a first set of threads exteriorly defined thereon and having a bore defined therein, an end defined on said body, said bore intersecting said end, (b) a second set of threads exteriorly defined on said body adjacent said end adapted to receive a flanged conduit connector nut for communication with said bore, (c) a valve seat defined within said bore, (d) a valve movably mounted within said body adapted to selectively engage said valve seat and close said bore against fluid flow therethrough, (e) a spring within said bore biasing said valve toward engagement with said valve seat, (f) a valve actuator movably mounted within said bore adapted to engage said valve, said actuator including a stem and a head, said stem having a first end adapted to engage said valve and a second end adapted to extend from said bore beyond said body end, said head being mounted on said stem second end and including a peripheral sealing portion normally spaced from said body end and adapted to be interposed between the flange of a flanged conduit connector nut assembly and said body end upon the assembly being threaded upon the body threads, and (g) a passage defined through said head.

2. In a valved fitting as in claim 1 wherein:
(a) said actuator stem is tubular and includes a wall, said passage including openings defined in said wall, said second end being open whereby fluid may flow through said openings and through said head.

3. In a valved fitting as in claim 1 wherein:
(a) said passage consists of an opening defined in said head intermediate said peripheral sealing portion and said stem.

4. In a valved fitting as in claim 2 wherein:
(a) a valve actuator retainer is interposed between said body and said valve actuator, said retainer including a bore frictionally, slidably, receiving said stem and thereby retaining said actuator within said bore.

5. In a valved fitting as in claim 1 wherein:
(a) said spring comprises a compression spring having a first end engaging said valve and a second end,
(b) a pin mounted in said body extending across said bore, said spring second end bearing against said pin.

References Cited

UNITED STATES PATENTS

| | | | |
|---|---|---|---|
| 1,464,301 | 8/1923 | Thompson | 251—149.4 |
| 2,459,716 | 1/1949 | Nickelsen | 241—149.4 |

FOREIGN PATENTS

| | | |
|---|---|---|
| 519,124 | 1/1921 | France. |
| 112,340 | 1/1918 | Great Britain. |
| 168,491 | 9/1921 | Great Britain. |
| 176,470 | 3/1922 | Great Britain. |
| 246,413 | 1/1926 | Great Britain. |

M. CARY NELSON, *Primary Examiner.*

W. R. CLINE, *Assistant Examiner.*